United States Patent [19]

Fujishiro et al.

[11] 4,262,251
[45] Apr. 14, 1981

[54] DEVICE FOR MEASURING ROTATIONAL ANGLE OF ROTARY MEMBER

[75] Inventors: Takeshi Fujishiro, Yokosuka; Toru Kita; Akio Hosaka, both of Yokohama, all of Japan

[73] Assignee: Nissan Motor Company, Limited, Yokohama, Japan

[21] Appl. No.: 930,321

[22] Filed: Aug. 2, 1978

[30] Foreign Application Priority Data

Aug. 29, 1977 [JP] Japan .................. 52-103399

[51] Int. Cl.³ .................. G01B 7/14; G01P 3/487; G01P 3/488
[52] U.S. Cl. .................. 324/208; 324/166; 324/167; 324/172; 324/392
[58] Field of Search .............. 324/207, 208, 173, 174, 324/175, 16 T, 166, 167, 172, 392; 123/32 EB, 32 EC, 117 D, 117 R, 146.5 A; 235/92 GE, 92 MP

[56] References Cited

U.S. PATENT DOCUMENTS

| | | | |
|---|---|---|---|
| 3,738,331 | 6/1973 | Huntzinger et al. | 123/117 D |
| 3,903,857 | 9/1975 | Hönig et al. | 123/117 D |
| 4,024,458 | 5/1977 | Templin | 324/208 |
| 4,053,826 | 10/1977 | Wasawa | 324/208 |
| 4,072,893 | 2/1978 | Huwyler | 324/208 |

*Primary Examiner*—Gerard R. Strecker
*Assistant Examiner*—Walter E. Snow

[57] ABSTRACT

A rotatable disk having a plurality of calibration segments and at least one marker along the peripheral portion thereof is provided while a stationary pick-up provided adjacent the disk for generating a first signal indicative of calibration segments and a second signal indicative of a reference position of the rotation of the disk. The frequency of the first signal is increased in order to accurately measure the rotational angle from the reference position.

14 Claims, 11 Drawing Figures

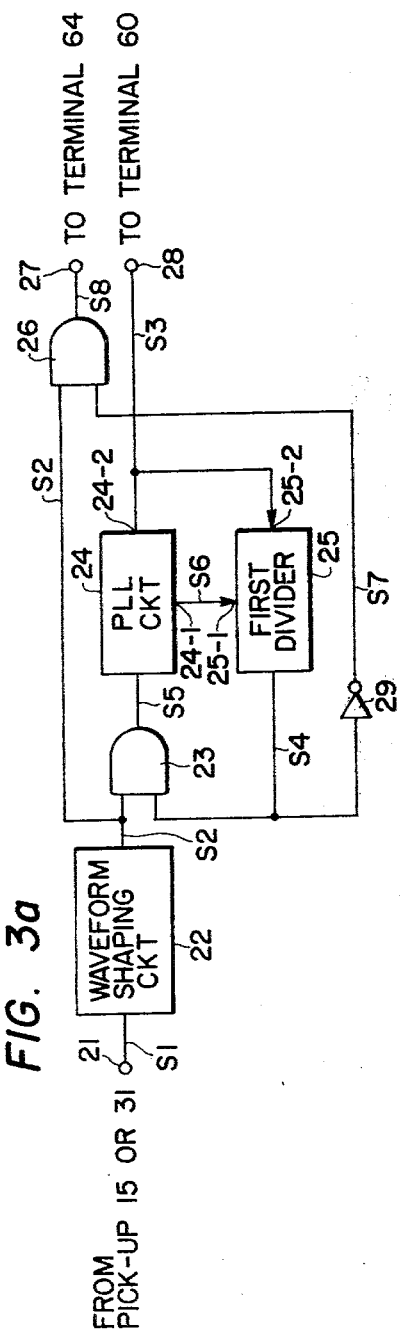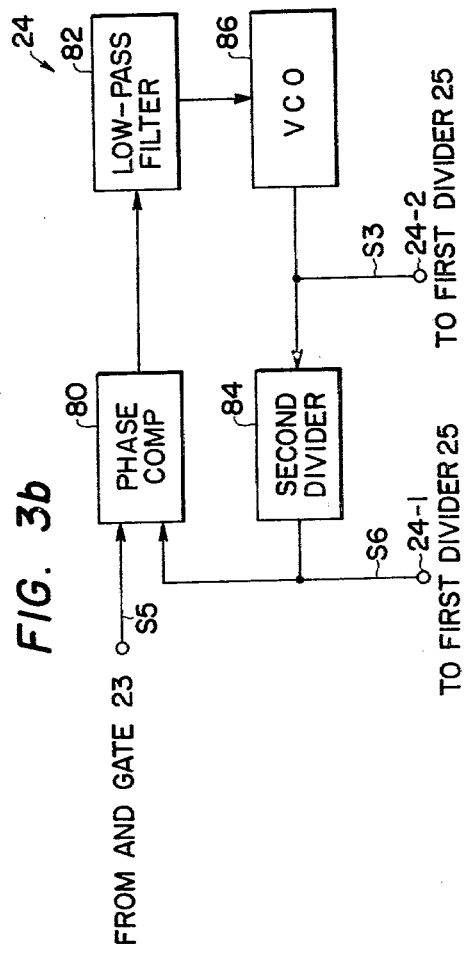
FIG. 3a
FIG. 3b

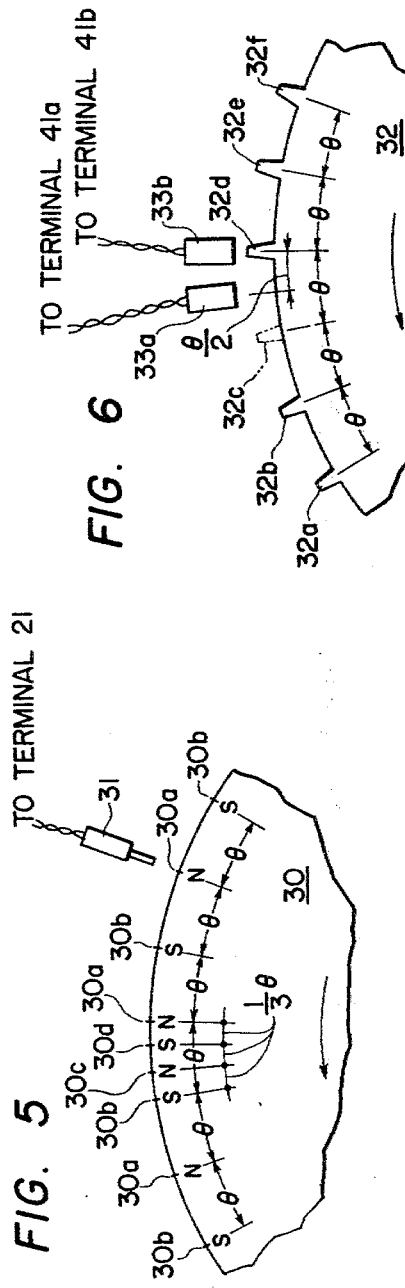
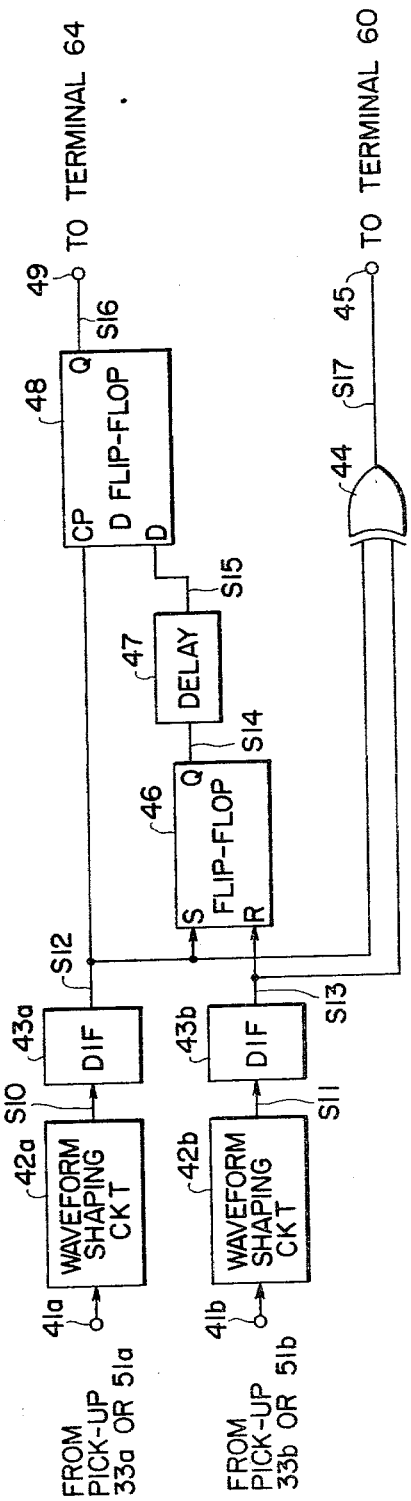
FIG. 5
FIG. 6
FIG. 7

DEVICE FOR MEASURING ROTATIONAL ANGLE OF ROTARY MEMBER

FIELD OF THE INVENTION

This invention generally relates to an apparatus which measures a rotational or angular displacement of a rotary member from a reference point or position. More specifically, the present invention relates to an apparatus which may measure the ignition timing advance angle of an internal combustion engine.

BACKGROUND OF THE INVENTION

There are various types of conventional apparatus for measuring the ignition timing advance angle of an internal combustion engine. In such an apparatus a signal indicative of the ignition timing advance angle is produced wherein said signal may be utilized for displaying the advance angle or giving the information of the ignition timing to a computer circuit which generates, for instance, a control signal with which the air/fuel ratio of the air/fuel mixture to be supplied to the engine is controlled. In one such type of apparatus a circular disk or body is fixedly connected to the crankshaft of an internal combustion engine so that the disk rotates in synchronization with the crank shaft. The circular disk has a plurality of gear teeth which have an equal circular pitch, along the peripheral surface of the disk. At least one marker, such as a projection, which is utilized for detecting the reference point or position of the circular disk, is mounted on the circular disk at a different position with respect to the gear teeth. Two pick-ups, which are of the electro-magnetic type, are respectively disposed on a fixed stationary member and are respectively arranged adjacent the peripheral surface and the circular track of the marker. These two pick-ups respectively emit a train of output signals when the circular disk rotates since the magnetic resistance between a first pick-up and the gear teeth and the magnetic resistance between the second pick-up and the marker vary as the disk rotates. A first signal produced by the first pick-up provides calibration pulses via which angular measurement can be made while a second signal produced by the second pick-up is used to indicate a reference time or position which corresponds to the reference position from which an angle can be measured using the calibration pulses.

In case of utilizing such an apparatus, there are two methods for increasing the accuracy of the measurement of the advance angle. The first method is to increase the number of the teeth, i.e. the calibrating members, and the second method is to employ more than two pick-ups which are aligned in a direction of the rotation of the circular disk, for producing, via suitable circuitry, a signal indicative of the phase difference between the output signals thereof. In the former case precision machining for producing the large number of gear teeth is required and thus the first method is not suited to mass-production. In the latter case, at least three pick-ups are necessary, viz. two for the teeth and one for the marker. The increase of the number of pick-ups causes a cost increase since each pick-up is relatively expensive. Moreover, if more than two pick-ups are disposed adjacent the peripheral surface of the disk, it is necessary to arrange these two-pick-ups within a circular pitch of the teeth. Further, an adjustment of the space between the pick-ups and the peripheral surface of the disk is troublesome and time consuming.

In another type of an apparatus for measuring the advance angle, only one pick up is employed for sensing both of the gear teeth and the marker. In this type of apparatus, the marker is disposed between two specific teeth, so that the pick-up which is arranged adjacent the peripheral surface of the circular disk, produces a train of pulse signals as the disk rotates. In order to distinguish a signal indicative of the reference position or angle from the other calibration pulse signals, the circular pitch between the two specific teeth is different from those of the other teeth which are equidistantly spaced or angularly displaced whereby the phases of the two signals are different from each other. Consequently, the output signal of the pick-up will be divided, by means of the phase difference, into two signals which respectively indicate the reference position and the calibration signals. In such an apparatus, a method of increasing the number of gear teeth is usually adopted for increasing the accuracy of measurement of a rotational angle since an increase in the number of pick-ups is contradictory to the purpose of using a single pick-up.

Other arrangements for measuring a rotational angle are possible. For instance, a combination of a circular disk which has a plurality of slits for providing calibration signals, a slit for providing a reference position signal, a lamp and photo-sensitive cell is known. Further, a combination of a circular disk the peripheral surface of which is magnetized to provide a plurality of N and S poles and a magneto-sensitive detector, which will be referred to as a pick up, disposed adjacent to the peripheral surface of the disk is known. However, no matter which of these known devices is utilized, the drawbacks set forth hereinabove are not overcome.

SUMMARY OF THE INVENTION

The present invention has been achieved in order to overcome the above mentioned drawbacks of the conventional type of apparatus, and will be referred to throughout this specification as an angulometer, for measuring a rotational angle of displacement of a rotary member. According to the present invention, circuitry which generates a plurality of pulses in response to passage of a segment, such as a tooth of gear and/or a magnetized portion, aligned on the peripheral portion of a rotatable disk, is provided. Namely, the number of pulses per segment passage, is increased by means of a multiplier or a gate circuit in the circuitry wherein the increased number of pulses are utilized as calibrations for measuring or determining the amount of angular displacement or rotation. A signal indicative of passage of a marker is produced for providing a reference time and/or indicating a reference position.

Therefore, it is an object of the present invention to provide an improved angulometer which accurately measures a rotational angle of a rotary member.

BRIEF DESCRIPTION OF THE PREFERRED EMBODIMENTS

The object and features of the present invention will become more readily apparent from the following detailed description taken in conjunction with the accompanying drawings in which:

FIG. 3a shows electrical circuitry utilized for the first embodiment of the angulometer according to the present invention;

FIG. 3b shows a phase-locked loop circuit shown in FIG. 3a;

FIG. 4 shows waveform diagrams of various signals obtained in the circuitry shown in FIG. 3a;

FIG. 5 shows a partial view of a circular disk utilized in a second preferred embodiment of the angulometer according to the present invention;

FIG. 6 shows a partial view of a circular disk utilized in a third preferred embodiment of the angulometer according to the present invention;

FIG. 7 shows electrical circuitry utilized for the third embodiment of the angulometer according to the present invention;

DETAILED DESCRIPTION OF THE PREFERRED EMBODIMENTS

Figure 1:
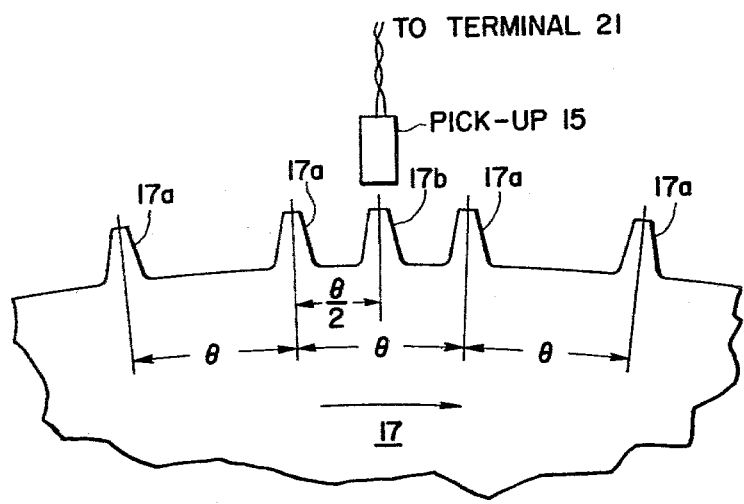
FIG. 1 shows a partial view of a circular disk or body utilized in a first preferred embodiment of the angulometer according to the present invention.

FIG. 1 illustrates a portion of a rotary disk or body 17 and a pick-up 15 which are employed in a first preferred embodiment of the angulometer according to the present invention. The pick-up 15 is fixedly connected to a fixed member, such as an engine block (not shown) so as to be stationary with respect to the disk 17 while the rotatable disk 17 is connected to the crankshaft of an internal combustion engine (both are not shown) so that the axes of rotation thereof are aligned. The rotatable disk 17 has a circular shape and further has a plurality of gear teeth 17a are spaced from each other with a predetermined distance expressed by a circular pitch in terms of angle $\theta$ with respect to the axis of the disk. Between two specific teeth 17a another tooth 17b, which is referred to as a marker, is disposed. The angular displacement of the marker 17b with respect to each adjacent tooth 17a is approximately half of $\theta$. The rotatable disk 17 is arranged by way of example to rotate clockwise, as shown by a directed line, in synchronization with the engine rotation. The pick-up 15 is an electromagnetic pick-up and thus produces a train of output pulse like signals when each teeth 17a of the gear and marker 17b passes the pick-up 15 by detecting the variation of the magnetic resistance therebetween.

The output signal of the pick-up 15 consists of two signals, i.e. a first signal produced in response to passage of the gear teeth 17a and a second signal produced in response to passage of the marker 17b. If the engine rotates at a constant speed, the spaces between the pulses of the first signal are constant where the phase of the pulse of the second signal is different from that of the first signal since the pulse of the second signal does not coincide with a pulse of the first signal. The first signal is utilized for providing calibration pulses for measuring an advance angle of an ignition pulse signal while the second signal is utilized for providing a reference position or angle which corresponds to a top dead center of a piston movement of one cylinder of the engine.

The number and the positions of the markers 17b are selected in accordance with the number of cylinders, such as 4, 6 and 8, and the type of engines, such as 2 and 4 cycle.

Figure 2:
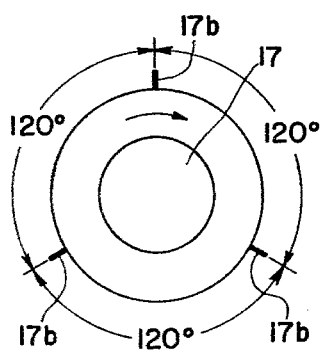
FIG. 2 shows a schematic view of the circular disk shown in FIG. 1.

FIG. 2 illustrates a schematic view of the rotatable disk or body 17. Assuming the engine has 6-cylinders and is of the 4-cycle type, the ignition pulses are successively produced each 120 degrees of the rotation of the rotatable disk 17. Therefore, 3 markers 17b for producing the reference positions are provided with an angular displacement of 120 degrees about the peripheral surface of the circular member 17. Since the teeth of gear 17a are equidistantly spaced, the total number of the teeth 17a is obtained by:

$$360/\theta$$

wherein the value of $\theta$ is so selected that a whole integer is obtained from the above division.

The positions of the markers 17b are so determined that one of the markers 17b passes the pick-up 15 each time one of the pistons of the six cylinders assumes a top dead position.

Reference is now made to FIG. 3 which shows circuitry utilized for the first embodiment of the angulometer according to the present invention. An input terminal 21 is provided for receiving the output pulse like signal S1 generated in the pick-up 15 shown in FIG. 1. The input terminal 21 is connected to an input of a waveform shaping circuit 22, such as a schmitt trigger circuit or a comparator, which produces an output pulse signal S2 the magnitude of which is of a logic level in response to the input pulse like signal S1. The output of the waveform shaping circuit 22 is connected to a first input of a first AND gate 23 and to first input of a second AND gate 26. The output of the first AND gate 23 is connected to an input of a PLL (phase-locked loop) circuit 24. A first output 24-1 of the PLL circuit 24 is connected to a first input 25-1 of a first divider 25 while a second output 24-2 of the PLL circuit 24 is connected to a second output terminal 28. An output of the first divider 25 is connected to a second input of the first AND gate 23 and to an input of a NOT gate 29. The output of the NOT gate 29 is connected to a second input of the second AND gate 26 the output of which is connected to a first output terminal 27.

The function of the circuitry shown in FIG. 3a will be described hereinafter taken in conjunction with FIG. 3b and FIG. 4. The pulse train signal S2, which includes pulses P1 to P5, is fed to the input of the PLL circuit 24 via the first AND gate 23 when a signal S4 supplied to the second input terminal of the first AND gate 23 assumes a high level.

FIG. 3b schematically illustrates a detailed block diagram of the PLL circuit 24 shown in FIG. 3a. The PLL circuit 24 includes a phase comparator 80, a low-pass filter 82, a voltage controlled oscillator (VCO) 86 and a second divider 84. The phase comparator 80 produces an output signal the magnitude of which is proportional to the phase difference between two input signals one of which is the signal S5 derived from the first AND gate 23. The output of the phase comparator 80 is connected to the low-pass filter 82 which blocks high frequency component of the output signal of the phase comparator 80. The VCO 86 is arranged to generate a high frequency signal S3 in accordance with the voltage of the output signal of the low-pass filter 82. The frequency of the signal S3 is "n" times, where "n"

is a whole integer, of the input signal S5 of the phase comparator 80. The output signal S3 is fed to the divider 84 the dividing ratio of which is 1/n and thus the divider 84 produces an output signal S6 the frequency of which is the same as that of the signal S5. The signal S6 is fed to an input of the phase comparator 80 and to the first output 24-1 of the PLL circuit 24.

With this arrangement the VCO 86 functions as a frequency multiplier. The multiplication ratio "n" of the VCO 86 is so determined that a suitable high frequency signal with respect to the input signal S5 is obtained. In this first embodiment the multiplication ratio "n" is 8 and the dividing ratio is $\frac{1}{8}$.

Turning back to FIG. 3a, the first divider 25 which is different from the second divider 84 included in the PLL circuit 24, produces an output signal S4 by dividing the pulse train signal S3 in synchronization with the output signal S6. A pulse of the output signal S4 of the first divider 25 is arranged to assume a low level when two pulses of the signal S3 are applied thereto after presence of the leading edge of a pulse of the signal S6. The output signal S4 is fed to the second input of the first AND gate 23 for providing periods of time for which the output pulse signal S2 of the waveform shaping circuit 22 are able to pass through the first AND gate 23. The signal S4 is further inverted by the NOT gate 29 and thus an inverted signal S7 is applied to the second AND gate 26 for providing periods of time for which the output pulse signal S2 is able to pass the second AND gate 26. With the above mentioned provision an output signal S8 of the second AND gate 26 is obtained at the first output terminal 27 while the pulse train signal S3 is obtained at the second output terminal 28.

Figure 4:
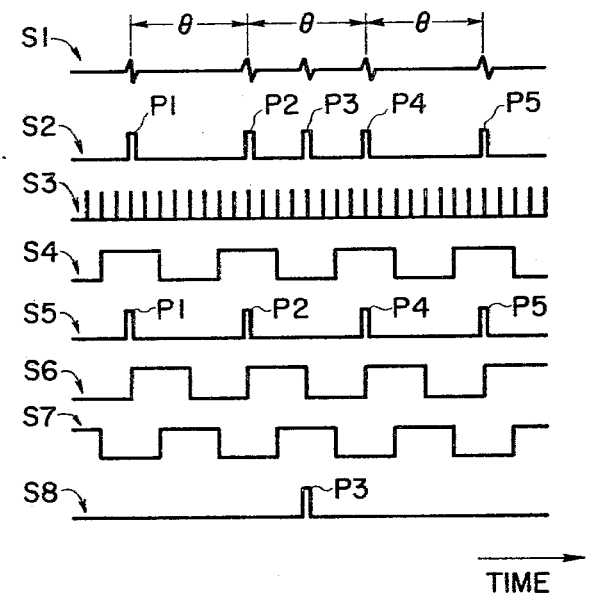

As shown in FIG. 4, the signal S2 includes a plurality of pulses such as P1, P2, P3, P4 and P5. Pulses P1, P2, P4 and P5 are produced in response to passages of the gear teeth 17a while the pulse P3 is produced in response to passage of the marker 17b. It is to be noted that the signals S5 and S8 respectively contain the former and latter groups of pulses (although the signal S8 is shown to include only one pulse P3, the signal S8 in fact includes 3 pulses during one rotation of the rotary disk 17). Since the output signal S3 is produced in synchronization with the signal S5 and includes a plurality of pulses during a period of time between two pulses such as P1 and P2 obtained in response to the passage of the teeth 17a of the gear, the signal S3 provides more calibration pulses for measuring the advance angle of an ignition timing than the signal S5. Not only the signal S3 but also the signal S8 are utilized for measuring the advance angle of the ignition pulses applied to each spark plug disposed in each cylinders of the internal combustion engine. In order to measure the advance angle, the number of the pulses of the signal S3 between an ignition pulse and the pulse P3 of the signal S8 will be counted. A description of circuitry which counts the number of the pulses will be made hereinlater.

FIG. 5 illustrates a portion of a circular disk utilized in a second embodiment of the angulometer according to the present invention. In the second embodiment a rotatable disk 30 having magnetized portions is utilized instead of the disk 17 shown in FIG. 1. Further, a magneto-sensitive pick-up 31 is provided instead of the electromagnetic pick-up 15 shown in FIG. 1. The magnetized disk 30 includes a plurality of magnetized portions along the peripheral portion of same where a plurality of N poles 30a and S poles 30b are aligned alternately.

Each of the poles 30a and 30b correspond to the gear teeth 17a shown in FIG. 1 and thus the distance between two consecutive poles are equal and expressed by $\theta$ in terms of angular displacement with respect to the axis of the rotation of the disk 30.

Between a specific N pole 30a and an adjacent S pole 30b, a pair of N and S magnetic poles 30c and 30d is arranged. One of these N and S poles 30c and 30d is utilized as a marker such as the marker 17b shown in FIG. 1. The N and S poles 30c and 30d are spaced from each other and further are respectively spaced from the adjacent poles 30b and 30a with a predetermined distance. In this embodiment the distance between the N pole 30c and the adjacent S pole 30b, the distance between the N pole 30c and the S pole 30d, and the distance between the S pole 30d and the adjacent N pole 30a are equal and thus are expressed by one third of $\theta$.

The pick-up 31 generates an electrical signal when the poles 30a–30d of the magnetized portions pass the nearest position thereof and thus a pulse train like signal, such as the signal S1 shown in FIG. 4, is derived from the outputs of the pick-up 31. However, two pulses are successively produced in response to passage of the N pole 30c and the S pole 30d. Only one of the pulses is utilized as the reference position signal, the other pulse being disregarded. In order to achieve this arrangement, one of the N and S poles 30c and 30d is arranged to correspond to the top dead center of a cylinder. The output signal of the pick-up 31 is applied to a like circuit as that shown in FIG. 3 and thus the advance angle of the ignition pulses is measured in the same manner.

In the above mentioned first and second embodiments according to the present invention, the segments such as the gear teeth 17a and magnetized portions 30a and 30b, can be arranged with an equal circular pitch along the entire peripheral portion of the rotatable circular disk such as the disks 17 and 30. In other words, there is no need to provide a different pitch portion of segments for providing a marker since two signals indicative of the calibration and a reference position are distinguished from the other without detecting the phase difference therebetween.

Production of a disk having such equidistantly spaced segments is much easier than that of a disk having a portion where the circular pitch of a segment is different. Such an arrangement of equidistantly spaced segments is also advantageous for multiplying the number of pulses produced in response to passage of the segments since there will not occur an undesirable phase deviation between the input signal and the multiplied output signal.

Reference is now made to FIG. 6 which shows a partial view of a circular member 32 utilized in a third embodiment of the angulometer according to the present invention. In the third embodiment, a rotatable disk 32 having a plurality of gear teeth 32a, 32b, 32d, 32e and 32f is provided. These teeth except for one are arranged along the peripheral surface of the disk 32 with a predetermined circular pitch or space expressed in terms of $\theta$. As shown by a dotted line, a tooth 32c is omitted so that the distance between two adjacent teeth 32b and 32d including the portion 32c is twice that of the other distances between teeth such as teeth 32a and 32b. The rotatable disk 32 is arranged by way of example to rotate counterclockwise as indicated by a directed line.

A first and second electro-magnetic pick-ups 33a and 33b are stationarily disposed adjacent to the peripheral surface of the disk 32. The first and second pick-ups 33a and 33b are aligned radially with respect to the rotatable disk 32 and angularly displaced by $\theta/2$. With this provision the output signals of the first and second pick-ups 33a and 33b have a phase difference of a half pitch of the circular pitch $\theta$ with respect to each other. The output signals will be fed to circuitry in which a reference time or position signal and a calibration signal are respectively produced.

Hence, reference is now made to FIG. 7 which shows the above mentioned circuitry utilized for the third embodiment. The circuitry shown in FIG. 7 includes first and second input terminals 41a and 41b which are respectively connected to the outputs of the pick-ups 33a and 33b. The first input terminal 41a is connected to an input of a first waveform shaping circuit 42a while the second input terminal 41b is connected to an input of the second waveform shaping circuit 42b. The outputs of each pulse waveform shaping circuit 42a and 42b are respectively connected to inputs of first and second differentiation circuits 43a and 43b. The output of the first differentiation circuit 43a is connected to a clock input CP of a D type flip-flop 48, to a set terminal S of a flip-flop 46 and to a first input of an EX (exclusive) OR gate 44. The output of the second differentiation circuit 43b is connected to a reset terminal R of the flip-flop 46 and to a second input of the EX-OR gate 44 the output of which is connected to a second output terminal 45. An output Q of the flip-flop 46 is connected to an input of a delay circuit 47 the output of which is connected to a data input D of the D type flip-flop 48. The output of the D type flip-flop 48 is connected to a first output terminal 49.

Figure 8:
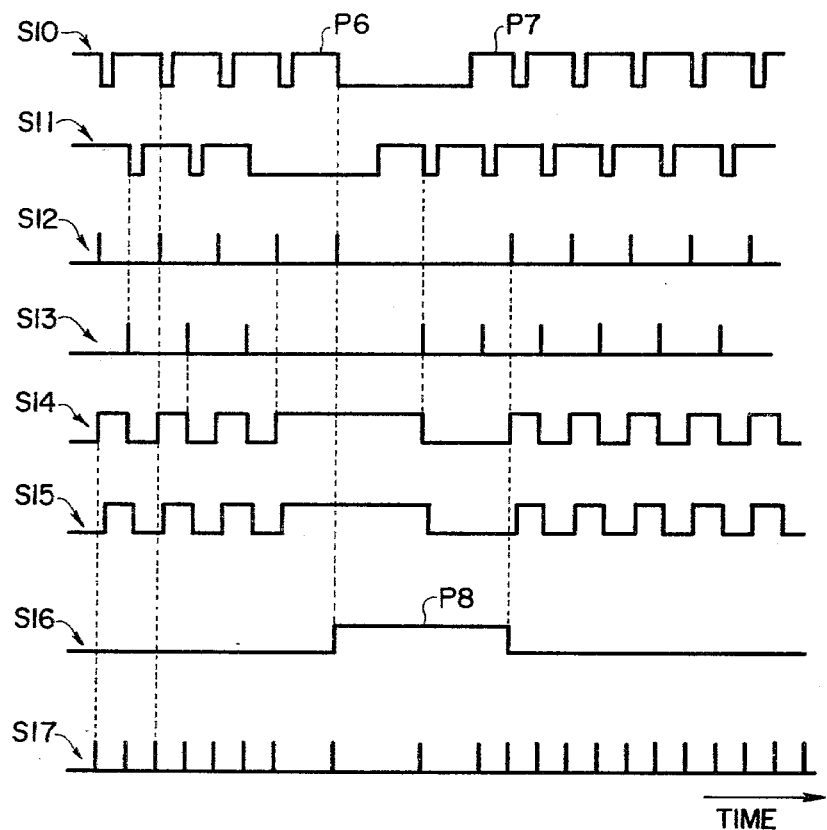
FIG. 8 shows waveform diagrams of various signals obtained in the circuitry shown in FIG. 7.

The function and operation of the circuitry shown in FIG. 7 will be made hereinafter taken in conjunction with signal waveforms shown in FIG. 8. The first and second waveform shaping circuit 42a and 42b, such as a schmitt trigger circuit or a comparator, respectively generates a train of logic level pulse signals S10 and S11, in response to the output signals derived from the first and second pick-ups 33a and 33b. The first and second differentiation circuits 43a and 43b respectively produces first and second train of impulses S12 and S13 in response to the trailing edges of the pulses of signals S10 and S11. Since the flip-flop 46 is set and reset by the first and second inpulses S12 and S13, an output pulse signal S14 is obtained at the output Q thereof. This output signal S14 is delayed by the delay circuit 47 and thus a delayed signal S15 is applied to the data input D of the D type flip-flop 48. The D type flip-flop 48 generates an output signal S16 having a pulse P8 the leading edge of which is determined by a first pulse of the signal S12 during a period for which a signal S15 assumes a high level and the trailing edge of the pulse P8 is determined by a first pulse of the signal S12 during a period for which the signal S15 assumes a low level.

On the other hand, the EX-OR gate 44 produces an output pulse signal S17 when the levels of the input signals S12 and S13 are different from each other. Consequently, the signals S16 and S17 are respectively obtained at the first and second output terminals 49 and 45. The leading edge of the pulse P8 of the signal S16 corresponds to the trailing edge of a pulse P6 which is generated by the first pick-up 33a in response to the passage of the tooth 32b while the trailing edge of the pulse P8 corresponds to the trailing edge of the pulse P7 which is generated by the first pick-up 33a in response to the passage of the tooth 32d. This pulse P8 of the signal S16 can be utilized for indicating a reference position, angle or time when a predetermined portion of the pulse P8 corresponds to the top dead center of a piston movement of a cylinder of the engine. Since the signal S17 corresponds to both of the signals S12 and S13, the number of pulses which are utilized as calibrations for measuring the rotational angle, is doubled compared to the number of the pulses of each differentiated signals S12 and S13. These two output signals S16 and S17 are utilized in the same manner as the signals S8 and S3, as in the first embodiment.

Figure 9:
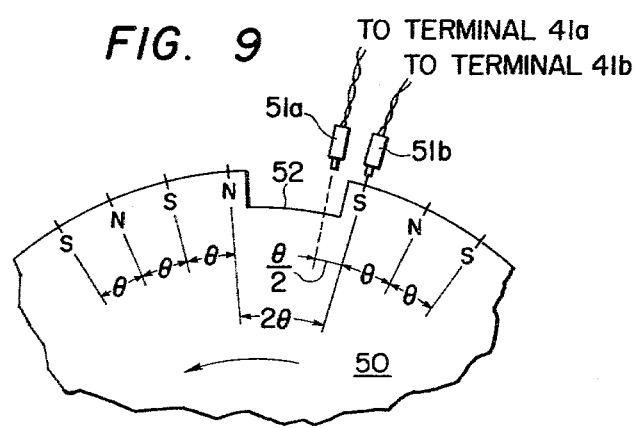
FIG. 9 shows a partial view of a circular disk utilized in a fourth preferred embodiment of the angulometer according to the present invention.

FIG. 9 illustrates a partial view of a magnetized circular disk 50 and a pair of magneto-sensitive pick-ups 51a and 51b which are utilized in a fourth embodiment of the angulometer according to the present invention. The combination of the disk 50 and a pair of pick-ups 51a and 51b can be connected to the circuitry shown in FIG. 7, instead of the disk 32 and pick-ups 33a and 33b shown in FIG. 6. The arrangement shown in FIG. 9 is the same as that shown in FIG. 6 except that the plurality of gear teeth 32a to 32f and the electromagnetic pick-ups 33a and 33b are respectively replaced by a plurality of magnetized portions N and S and magneto-sensitive pick-ups 51a and 51b. The disk 50 has a recess 52 between specific magnetized portions N and S which are angularly displaced by an angle $2\theta$ where other magnetized portions N and S are equidistantly separated with an angle $\theta$. The recess 52 is made for providing an unmagnetized portion which corresponds to the tooth omitted portion 32c of the disk 32 shown in FIG. 6. If desired, instead of providing such a recess 52 for the rotatable disk 50, it is possible to obtain the same effect by not magnetizing the portion which corresponds to the recess 52. It is also possible to obtain the same effect by reducing the magnitude of the magnetization of the portion corresponding to the recess 52 without providing such a recess 52.

Figure 10:
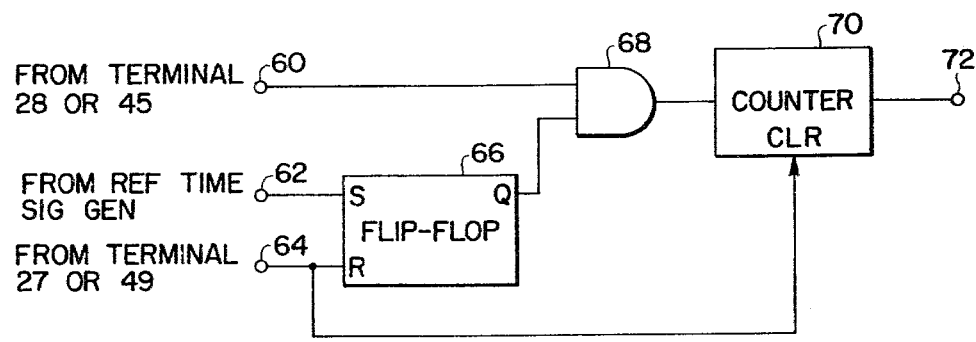
FIG. 10 shows electrical circuitry for counting the number of pulses produced by circuitry shown in FIG. 3a or FIG. 7.

Reference is now made to FIG. 10 which shows circuitry for counting the number of pulses derived from the circuitry shown in FIG. 3a or FIG. 7. The circuitry shown in FIG. 10 includes a flip-flop 66, an AND gate 68 and a counter 70. A first input terminal 60 is connected to a first input of the AND gate 68 while second and third input terminals are respectively connected to set and reset terminals S and R of the flip-flop 66. The output of the flip-flop 66 is connected to a second input of the AND gate 68 the output of which is connected to an input of the counter 70. The third input terminal 64 is further connected to a clear terminal CLR of the counter 70 the output of which is connected to an output terminal 72 of the circuitry.

The first input terminal 60 and the third input terminal 64 may be respectively connected to the second output terminal 28 and the first output terminal 27 of the circuitry shown in FIG. 3 or to the second output terminal 45 and the first output terminal 49 of the circuitry shown in FIG. 7. The second input terminal 62 is connected to a pulse signal generator (not shown) which provides a second reference time or position. When the circuitry shown in FIG. 10 is utilized for measuring the advance angle of ignition timing of the engine operation, a pulse signal generated in response to an ignition pulse may be applied to the second input terminal 62. With this arrangement it is apparent that a calibration signal is applied to the AND gate 68 via the first input terminal 60 while the flip-flop 66 is set and reset for producing an output pulse signal by two different reference signals one of which is the pulse signal produced in response to the ignition pulses and the other is the pulse P3 of the signal S8 shown in FIG. 4 or the pulse P8 of the signal S16 shown in FIG. 8.

Consequently, a pulse train signal such as the signal S3 or the signal S17 is fed via the AND gate 68 to the counter 70 during a time period defined by two reference time or position signals. The counter 70 counts the number of pulses applied thereto and thus a signal indicative of the counted number is obtained at the output terminal 72. Since the clear terminal CLR of the counter 70 is fed with the signal S8 or the signal S16, the counted number is cleared at the end of each counting period of time and then the counter 70 starts counting again. The output signal derived from the counter 70 may be utilized for displaying the measured rotational angle or for applying the information of the measured angle to a suitable control circuit such as a closed loop air/fuel ratio control circuit.

From the foregoing, it will be clearly understood that according to the present invention the accuracy of the measurement of a rotational angle of a rotary member is increased without increasing the number of segments such as teeth or poles and the number of markers, whereby the control of the internal combustion engine and the reduction of the harmful components contained in the exhaust gases, will become more accurate via the accurate measurement of the advance angle of the ignition timing. However, the technique of the measurement of the rotational angle is not limited within the engine rotation and may be adopted any rotational member used in many fields.

What is claimed is:

1. a device for measuring a rotational angle of a rotary member, comprising:
   (a) a rotatable member arranged to rotate in synchronization with said rotary member;
   (b) sensor means fixedly disposed adjacent to the peripheral portion of said rotatable member;
   (c) first means arranged on said peripheral portion of said rotatable member for causing said sensor means to generate a pulse train signal when said rotatable member rotates, said first means having a plurality of elements angularly spaced about said rotatable member in the direction of rotation thereof, said elements being arranged with an equal circular pitch, expressed in terms of $\theta$, along the entire periphery of said rotatable member;
   (d) marker means arranged on said peripheral portion of said rotatable member for causing said sensor means to produce a first reference position signal when said rotatable member rotates, said marker means having at least one element disposed between two consecutive elements of said first means, the circular pitch defined by one of said marker means being expressed in terms of $n\theta$ wherein "n" is one of $\frac{1}{2}, \frac{1}{3}, \frac{1}{4} \ldots$;
   (e) an electric circuit connected to said sensor means for distinguishing said pulse train signal produced in response to passage of said first means from said first reference position signal produced in response to passage of said marker means:
   (f) multiplying means for multiplying the frequency of said pulse train signal with a predetermined multiplication ratio for increasing the number of pulses; and
   (g) counting means connected to said multiplying means and to said electric circuit for counting the number of multiplied pulses for a period of time defined by said first reference position signal and a second reference position signal which is independently provided for measuring a rotational angle of said rotary member.

2. A device as claimed in claim 1, wherein said sensor means comprises a single pick-up.

3. A device as claimed in claim 1, wherein said first means comprises a plurality of gear teeth aligned along the peripheral portion of said rotatable member, the circular pitches of said gear teeth being equal; and wherein said marker means comprises at least one projection portion between two consecutive teeth of said gear teeth.

4. A device as claimed in claim 3, wherein said projecting portion is angularly displaced from an adjacent tooth of said gear teeth by half of said circular pitch.

5. A device as claimed in claim 1, wherein said first means comprises a plurality of magnetized portions aligned along the peripheral portion of said rotatable member the circular pitch of said magnetized portions being equal; and wherein said marker means comprises at least one magnetized portion between two consecutive magnetized portions.

6. A device as claimed in claim 5, wherein said magnetized portion between two consecutive magnetized portions is angularly displaced from an adjacent magnetized portion by one third of said circular pitch.

7. A device as claimed in claim 1, wherein said electric circuit and said multiplying means comprises:
   (a) waveform shaping means for producing a train of logic level pulses in response to the output signal of said sensor means;
   (b) a first logic gate a first input of which is connected to an output of said waveform shaping means;
   (c) a phase-locked loop circuit an input of which is connected to an output of said first logic gate, said phase locked loop circuit including a voltage controlled oscillator which produces a multiplied frequency signal where the multiplication ratio is predetermined, and a first divider connected to an output of said voltage controlled oscillator the dividing ratio being a reciprocal of the multiplication ratio;
   (d) a second divider having first and second inputs respectively connected to an output of said first divider and to an output of said voltage controlled oscillator, and an output connected to a second input of said first logic gate, said first logic gate producing an output signal when two input signals coincide, said second divider dividing the multiplied frequency signal with the same dividing ratio as that of said first divider, said second divider producing a synchronous signal having a different phase with respect to the output signal of said first divider;
   (e) a second logic gate a first input of which connected to the output of said waveform shaping means; and
   (f) an inverting circuit an input of which is connected to the output of said second divider while the output of said inverting circuit is connected to a second input of said second logic gate, said second logic gate producing an output signal when two input signals coincide.

8. a device for measuring a rotational angle of a rotary member comprising:
   (a) a rotational member arranged to rotate in synchronization with said rotary member;

(b) first and second sensor means fixedly disposed adjacent to the peripheral portion of said rotatable member, said first and second sensor means being aligned radially with respect to said rotatable member and angularly disposed;

(c) first means arranged on said peripheral portion of said rotatable member for causing said first and second sensor means to respectively generate first and second pulse train signals when said rotatable member rotates, said first means having a plurality of elements angularly spaced about said rotatable member in the direction of rotation thereof, said elements being arranged with an equal pitch, expressed in terms of $\theta$, along the entire periphery of said rotatable member except for portion or portions at which marker means is provided;

(d) marker means arranged on said peripheral portion of said rotatable member for causing said first and second sensor means to respectively generate first and second reference position signals, when said rotatable member rotates, said marker means being defined by the absence of at least one of said elements of said first means so that the circular pitch defined by the two elements of said first means between which said marker means is defined is expressed in terms of $n\theta$ wherein "n" is 2, 3, 4 . . . ;

(e) an electric circuit connected to said first and second sensor means for distinguishing said first and second pulse train signals produced in response to passage of said first means from said first and second reference position signals produced in response to passage of said marker means, said electric circuit further generating a third reference position signal in response to said first and second reference position signals;

(f) gate means responsive to the output signals of said first and second sensor means for increasing the number of pulses by permitting the transmission of said first and second pulse train signals; and (g) counting means connected to said gate means and to said electric circuit for counting the number of increased pulses for a period of time defined by said third reference position signal and a fourth reference position signal which is independently provided for measuring a rotational angel of said rotary member.

9. A device as claimed in claim 8, wherein said first means comprises a plurality of gear teeth aligned along the peripheral portion of said rotatable member, the circular pitches of said gear teeth being equal except a portion where said marker means is arranged.

10. A device as claimed in claim 8, wherein said first means comprises a plurality of magnetized portions aligned along the peripheral portion of said rotatable member, the circular pitches of said magnetized portions being equal except a portion where said marker means is arranged.

11. A device as claimed in claim 9, wherein said marker means comprises a portion at which no gear teeth are arranged, the circular pitch of said portion being greater than the circular pitch of said gear teeth and is smaller than a multiple of the circular pitch of said gear teeth.

12. A device as claimed in claim 10, wherein said marker means comprises a recess provided on the peripheral portion of said rotatable member between two consecutive magnetized portions, the circular pitch of said recess being greater than the circular pitch of said magnetized portions and being smaller than a multiple of the circular pitch of said magnetized portions.

13. A device as claimed in claim 8, wherein said first and second sensor means are so angularly displaced from each other that the first and second pulse train signals produced by said first and second sensor means have a phase difference, with respect to each other, of a half cycle of said first and second pulse train signals.

14. A device as claimed in claim 8, wherein said electric circuit and said gate means comprises:

(a) first and second waveform shaping means for respectively producing first and second trains of pulses of a logic level in response to the output signals of said first and second sensor means;

(b) first and second differentiation circuits respectively connected to said first and second waveform shaping means for producing first and second differentiated signals in response to the trailing edges of the pulses of said first and second trains of pulses;

(c) a first bi-stable circuit connected to said first and second differentiation circuits for producing an output pulse signal the leading edge and the trailing edge of which are defined by said first and second differentiated signals;

(d) a delay circuit connected to the output of said first bi-stable circuit for producing a delayed signal of the bi-stable circuit output signal;

(e) a second bi-stable circuit a clock input and a data input of which are respectively connected to said first differentiation circuit and to said delay circuit; and (f) a logic gate connected to said first and second differentiation circuits for passing said first and second differentiated signals.

* * * * *